United States Patent
Katz et al.

(10) Patent No.: US 8,930,759 B2
(45) Date of Patent: Jan. 6, 2015

(54) STREAM GENERATION

(75) Inventors: Yoav Katz, Haifa (IL); Michal Rimon, Nofit (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 13/437,001

(22) Filed: Apr. 2, 2012

(65) Prior Publication Data

US 2013/0262932 A1 Oct. 3, 2013

(51) Int. Cl.
*G06F 11/00* (2006.01)

(52) U.S. Cl.
USPC .......................................... 714/32

(58) Field of Classification Search
CPC ............ G06F 11/3404; G06F 11/3409; G06F 11/3684; G06F 11/3696
USPC ......................... 714/32, 33, 39, 45
See application file for complete search history.

(56) References Cited

U.S. PATENT DOCUMENTS

| | | | |
|---|---|---|---|
| 6,457,173 B1 * | 9/2002 | Gupta et al. ................. | 717/149 |
| 6,698,012 B1 * | 2/2004 | Kossatchev et al. .......... | 717/126 |
| 6,871,298 B1 * | 3/2005 | Cavanaugh et al. ............ | 714/33 |
| 7,627,843 B2 * | 12/2009 | Dozorets et al. ............... | 716/106 |
| 2004/0078674 A1 * | 4/2004 | Raimi et al. .................... | 714/33 |
| 2008/0177968 A1 | 7/2008 | Emek et al. | |
| 2009/0100211 A1 | 4/2009 | Morizawa | |

FOREIGN PATENT DOCUMENTS

| | | |
|---|---|---|
| JP | 2011048412 | 3/2011 |
| JP | 2011048785 | 3/2011 |

* cited by examiner

*Primary Examiner* — Scott Baderman
*Assistant Examiner* — Joseph Kudirka
(74) *Attorney, Agent, or Firm* — Riu Glazberg

(57) ABSTRACT

A method, apparatus and product for generating elements based on generation streams. The method comprises: obtaining one or more generation streams, wherein the streams comprise elements, wherein each element is a formal specification of an operation that stimulates a system, wherein based on each of the generation streams one or more alternative stimuli for the system can be generated, which stimuli comprises operations according to the elements; and generating a stimuli in accordance with the one or more generation streams, wherein the stimuli comprises at least one hybrid operation, wherein the hybrid operation complies simultaneously with two or more elements of the one or more generation stream, whereby the stimuli is comprised of a number of operations that is smaller than a sum of the numbers of elements of the one or more generation streams.

20 Claims, 3 Drawing Sheets

STREAM GENERATION

TECHNICAL FIELD

The present disclosure relates generally to verification and, more particularly to generation of stimuli that is useful in verification.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

Functional verification is one method that may be employed to increase quality of the computerized device. Functional verification aims at checking that the design of the computerized device is in accordance with requirements. One method of performing functional verification is by generating stimuli and injecting the stimuli to the target system or a simulation thereof. The target system is also referred to as a Design Under Test (DUT). The generation may be biased towards stimuli of relatively high quality. Generation may be based on one or more generation streams. The streams may be manually defined, may be generated based on test templates, or the like.

The generated stimuli may be provided to DUT or a simulation thereof. The simulation may be performed by a simulator, an emulator, a post-silicon product of the target system, a prototype of the target system, or the like It will be noted that simulation of the DUT may be performed by a device, such as a simulator, capable of simulating execution of the DUT based on a descriptive language describing the DUT, such as for example an Hardware Descriptive Language (HDL), SystemC, Verilog or the like. In some exemplary embodiments, online generators employ generation-simulation cycles, in which one or more operations that stimulate the DUT are generated and are provided to the DUT or simulation thereof. Additionally or alternatively, offline generators may generate the operations and once all operations are generated, utilize them to stimulate the DUT or simulation thereof.

BRIEF SUMMARY

One exemplary embodiment of the disclosed subject matter is a computer-implemented method performed by a processor, the method comprising: obtaining one or more generation streams, wherein the streams comprise elements, wherein each element is a formal specification of an operation that stimulates a system, wherein based on each of the generation streams one or more alternative stimuli for the system can be generated, which stimuli comprises operations according to the elements; generating a stimuli in accordance with the one or more generation streams, wherein the stimuli comprises at least one hybrid operation, wherein the hybrid operation complies simultaneously with two or more elements of the one or more generation stream; and whereby the stimuli is comprised of a number of operations that is smaller than a sum of the numbers of elements of the one or more generation streams.

Another exemplary embodiment of the disclosed subject matter is a computerized apparatus having a processor, the processor being adapted to perform the steps of: obtaining one or more generation streams, wherein the streams comprise elements, wherein each element is a formal specification of an operation that stimulates a system, wherein based on each of the generation streams one or more alternative stimuli for the system can be generated, which stimuli comprises operations according to the elements; and generating a stimuli in accordance with the one or more generation streams, wherein the stimuli comprises at least one hybrid operation, wherein the hybrid operation complies simultaneously with two or more elements of the one or more generation stream, whereby the stimuli is comprised of a number of operations that is smaller than a sum of the numbers of elements of the one or more generation streams.

Yet another exemplary embodiment of the disclosed subject matter is a computer program product comprising: a non-transitory computer readable medium retaining program instructions, which instructions when read by a processor, case the processor to performs the steps of: obtaining one or more generation streams, wherein the streams comprise elements, wherein each element is a formal specification of an operation that stimulates a system, wherein based on each of the generation streams one or more alternative stimuli for the system can be generated, which stimuli comprises operations according to the elements; and generating a stimuli in accordance with the one or more generation streams, wherein the stimuli comprises at least one hybrid operation, wherein the hybrid operation complies simultaneously with two or more elements of the one or more generation stream, whereby the stimuli is comprised of a number of operations that is smaller than a sum of the numbers of elements of the one or more generation streams.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
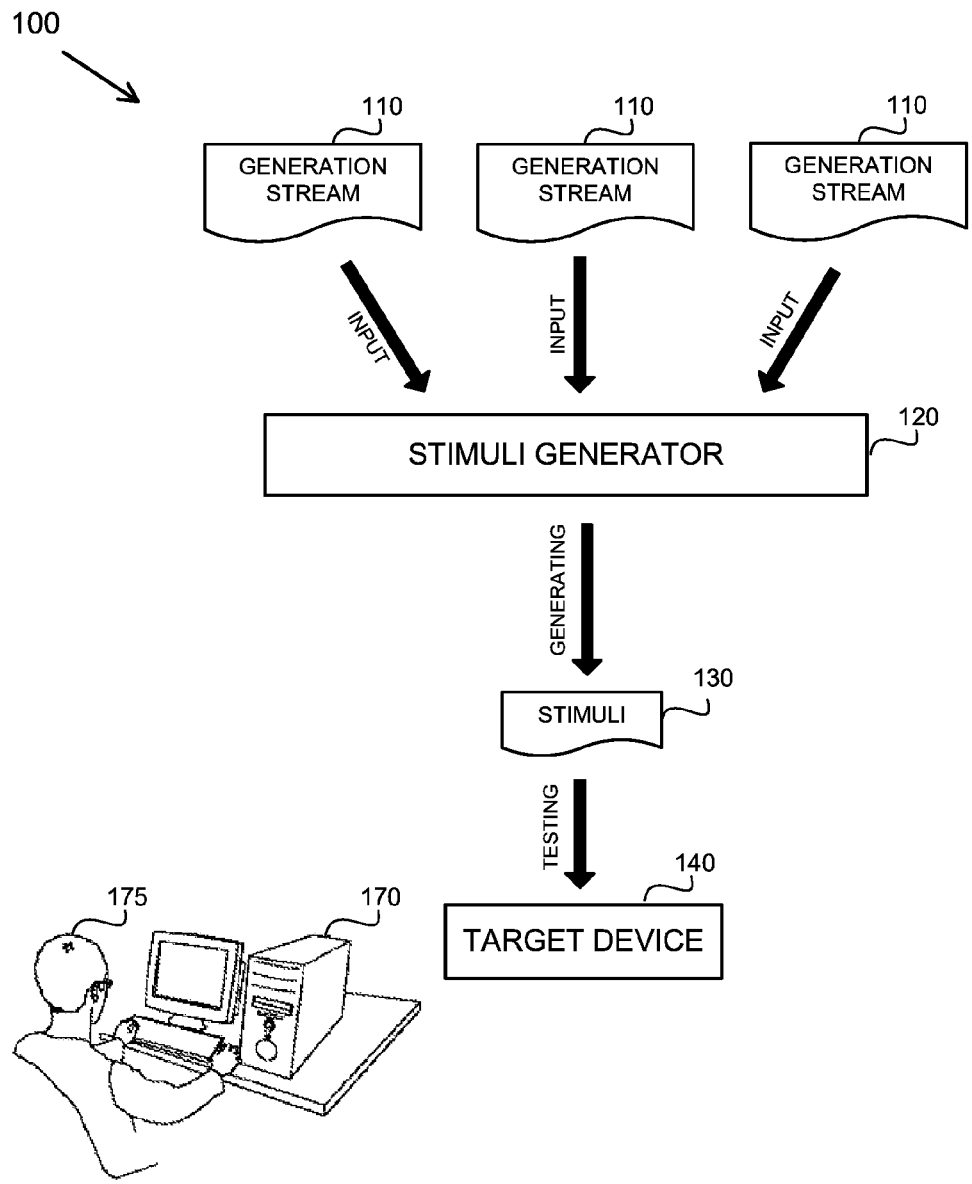
FIG. 1 shows an illustration of a computerized environment in accordance with the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to generate a set of operations that stimulate a DUT (referred to herein as a "stimuli") based on one or more generation element streams. Another technical problem is to generate the stimuli such as to increase the probability of hitting corner cases and exposing bugs. Yet another technical problem is to generate stimuli that is likely to simultaneously trigger multiple events in the DUT.

A "generation stream" defines a set of operations to be generated, wherein the stream comprises elements which are requirements of each such generated operation. Based on the generation stream a plurality of different and alternative stimuli may be generated. In some exemplary embodiments, the generated operations are transactions to be performed by the DUT, the generated operations may be instructions to a processor, database queries, hardware system transactions (e.g. bus operations), or the like.

In some exemplary embodiments, a generation stream defines a scenario of operation of the DUT. A generation stream may comprise elements to be generated so as to depict the scenario. Scenarios may target specific events in the DUT which are to be verified.

One technical solution is to identify combinable elements in the generation streams and generating a single hybrid operation that is in line with the combinable elements. The hybrid operation, also referred to as overlaid operation, may combine requirements of the different elements. In some exemplary embodiments, the overlaid operation may combine parts of different streams, thereby performing a role in two or more different scenarios simultaneously.

As an example only, consider a case in which there two different collision scenarios, each represented using different generation streams. One scenario is a store instruction followed by a load instruction to the same address. The second scenario is two load instructions to the same cache line but not the same address. The generated stimuli may be, for example, the following:

st G1→1000
ld G3←1004
ld G2←1000

Where, the first instruction (st G1) is the store instruction of the first scenario, the second instruction (ld G2) is the first load instruction of the second scenario, and the third instruction (ld G2←1000) performs the role of the load instructions in the first scenario and the second load in the second scenario. As can be appreciated, the second load instruction loads from the same address in which the store instruction stored (as required by the first scenario) and loads from the same cache line, but a different address then the first load instruction (as required by the second scenario).

As opposed to the utilization of a hybrid operation, without use of such operation a stimuli in accordance with the two scenarios may be, for example:

st G1→1000//Store of the first scenario
ld G2←1000//Load of the first scenario (same address as the store)
ld G3←2004//First load of the second scenario
ld G4←2008//Second load of the second scenario (same cache line as first load)

or:

st G1→3000//Store of the first scenario
ld G3←1004//First load of the second scenario
ld G2←3000//Load of the first scenario (same address as the store)
ld G4←1008//Second load of the second scenario (same cache line as first load)

or the like.

It will be noted that the use of hybrid operation may not necessarily require having more than a single stream. In some exemplary embodiments, two elements of a single stream may be implemented using a single hybrid operation in accordance with the disclosed subject matter.

Another technical solution is to identify candidates for overlays. Identification of candidates may be based on whether or not they comprise contradicting requirements. For example, utilization of different instruction mnemonics may be indicative that two elements for instruction generation have contradicting requirements. As another example, even if the same mnemonics are used, different constraints may be applied on the parameters, such as accessing different memory addresses.

Yet another technical solution is to determine which operations to overlay using a single hybrid operation based on testing knowledge, either generic or user-tailored, thereby increasing the quality of the generated stimuli. For example, referring to the abovementioned example, it may be more interesting to overlay second instructions of collision scenarios because such overlay creates simultaneous collisions.

One technical effect is that the disclosed subject matter is improving the probability of hitting the corner cases by the generated stimuli.

Another technical effect is generating a more compact stimuli that comprises a smaller number of operations than the sum of number of elements comprised by the generation streams. Compact stimuli may be more likely to trigger different functionalities of the DUT in parallel thereby increasing likelihood of discovering a bug in the DUT. Referring to the aforementioned example, the likelihood of triggering the collisions of both scenarios simultaneously is increased as a single processor instruction (e.g., .ld G2←1000) is aimed at causing both the collision of the first scenario (i.e., write-read collision) and the collision of the second scenario (i.e., read-read collision).

Referring now to FIG. 1 showing an illustration of a computerized environment in accordance with the disclosed subject matter. Computerized Environment 100 is being utilized by a User 175, such as a verification engineer, a Quality Assurance (QA) staff member, developer, or the like, for testing a Target Device 140. User 175 may utilize a Man-Machine Interface (MMI) 170, such as a terminal, a keyboard, a pointing device, a display, or the like, to interact with Computerized Environment 100.

A Generation Stream 110, such as a stream depicting a scenario of processor instructions, system transactions, event and reactions thereof, or the like, may be provided as an input to a Stimuli Generator 120. In some exemplary embodiments, a plurality of potentially different generation streams may be provided and Stimuli Generator 120 may be adapted to generate a stimulus that implements all of the different streams. The Generation Stream 110 may be based on a test template, may be manually defined by the user 170, or the like.

Stimuli Generator 120 may be configured to generate Stimuli 130 useful in testing or otherwise verifying functionality of a Target Device 140. In some exemplary embodiments, based on the generation streams a plurality of stimulis may be generated and used in verifying functionality of Target Device 140.

In some exemplary embodiments, Generation Stream 110 may define scenario elements in the scenario, constraints on the parameters of scenario elements, order between scenario elements, relations between properties of scenario elements, or the like. Generated Stimuli 130 is in line with the one or more Generation Stream 110 and may combine their cumulative requirements. Stimuli 130 may be utilized in testing, automatically, manually, or semi-automatically, Target Device 140. It will be understood that Target Device 140, also referred to as DUT, may be a hardware device, a software implemented tool, a protocol or implementation thereof, a reactive system, or the like. It will be noted that the disclosed subject matter is applicable to software testing as well as hardware verification, and any similar quality assurance process.

In some exemplary embodiments, Stimuli Generator 120 may identify one or more elements comprised by Generation Streams 110 that may be combinable and generate a single hybrid operation that complies with the different requirements.

Figure 2:
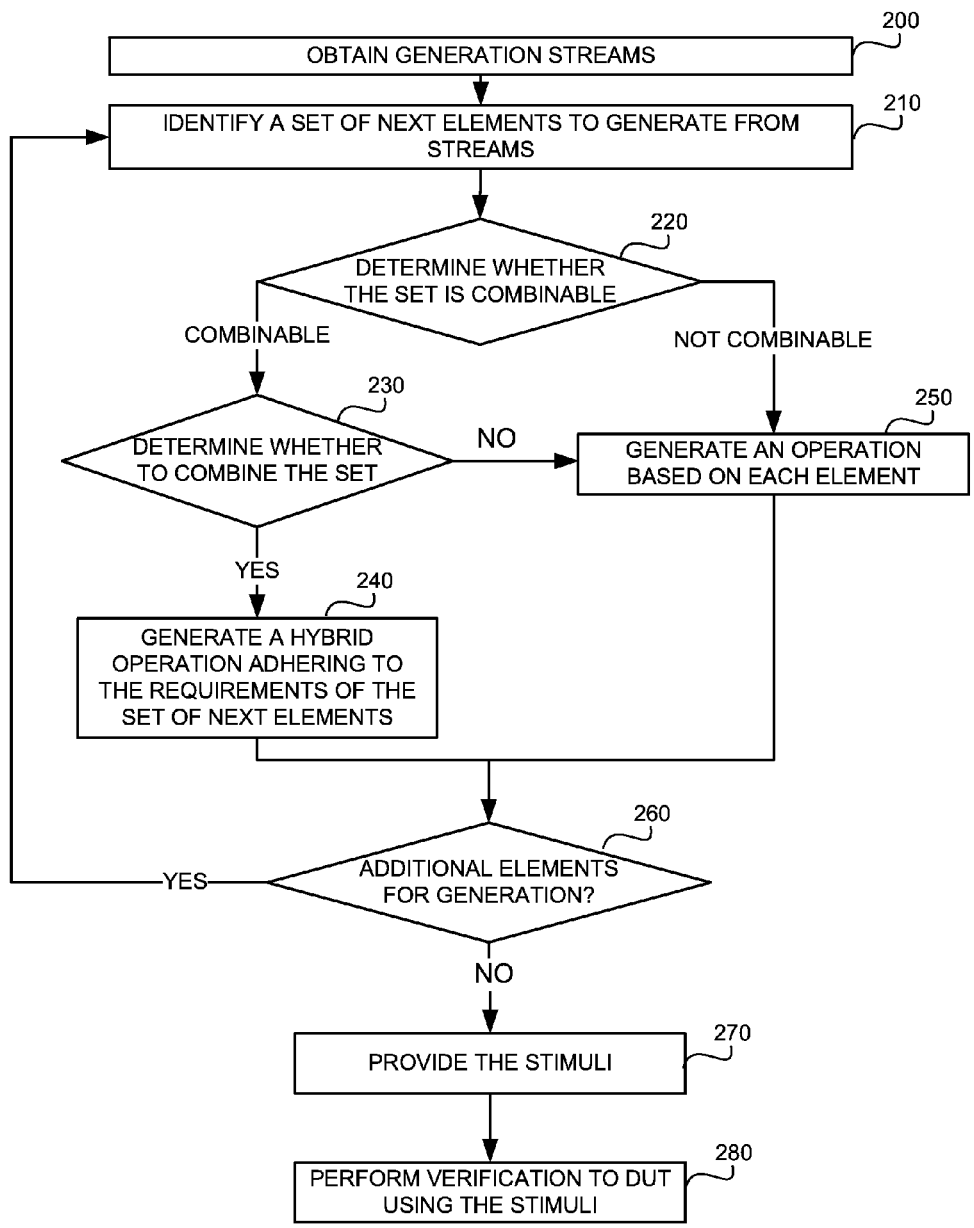
FIG. 2 shows a flowchart diagram of steps in a method for generating stimuli, in accordance with some exemplary embodiments of the disclosed subject matter.

Referring now to FIG. 2 showing a flowchart diagram of steps in a method for generating stimuli, in accordance with some exemplary embodiments of the disclosed subject matter.

In Step 200, one or more generation streams may be obtained. The generation streams, such as 110 of FIG. 1, may be generated based on a test template. Each generation stream may comprise elements to be generated so as to depict a scenario. Additionally or alternatively, the generation stream may define an order between elements thereof. For example, referring again to the example above, first performing a write access and only thereafter performing a read access. In some exemplary embodiments, a stream may comprise a specification of each operation to be generated in accordance with the scenario.

In Step 210, a set of next element for generation may be identified. In some exemplary embodiments, a next element to be generated from each stream may be determined, thereby determining a set of next elements to generate. As the scenario of the different streams may be interleaved or combined in any other manner, at each point, an element from a different stream may be selected to be generated. However, it will be understood that in some exemplary embodiments, the set of next elements to generate may comprise elements from a same stream, such as when several elements do not have a predetermined order defined therebetween.

Generally, any element out of the set may be selected for generation as a basis for generating the next operation of the stimuli.

In Step 220, a determination whether the set is combinable may be performed. A combinable set of elements may be implemented using a single hybrid operation. A determination whether or not the items comprise contradicting requirements may be performed.

In Step 230, and in case the set is combinable, a determination whether to combine the set may be performed. The determination of step 230 may be biased to generate stimuli having a relative high quality. Additionally or alternatively, the determination may be random or partially random so as to enable generation of different stimulis.

Additionally or alternatively, the determination may be based on testing knowledge. For example, it may be more interesting to overlay operations that are likely to have some interesting effect such as triggering events simultaneously. The determination may be based on generic testing knowledge, such as preferring to overlay elements from different streams, preferring to overlay later elements than earlier elements, or the like. Additionally or alternatively, the determination may be based on a user provided testing knowledge or otherwise based on a user selection, such as defining preferred transactions to overlay.

In case it is determined to combine the elements, in Step 240, a hybrid operation adhering to the requirements of the set of next elements may be generated. In some exemplary embodiments, all non-contradicting requirements may be combined and an operation may be generated to adhere to all of them.

It will be noted that although steps 220-240 refer to the set of next elements, in some exemplary embodiments, only a subset of the set may be combined. For example, consider three generation streams, where two elements out of the three can be combined and are determined to be combined, whereas the third item cannot be combined (Step 220) or is determined not to be combined (Step 230). The disclosed subject matter may therefore combine the subset. However, for clarity of the description, the set is assumed to be examined as a whole. This description is provided for clarity of explanation only and does not limit the disclosed subject matter.

In some exemplary embodiments, Step 220 and/or Step 230 do not provide a "yes/no" result, but rather provide a subset of items that can be combined (Step 220) or determined to be combined (Step 230) out of the original set of Step 210.

In Step 250, and in case the set is not to be combined, plurality of operations are generated based on the set. In some exemplary embodiments, for each element in the set a distinct operation is generated.

In Step 260, it may be determined whether there are additional elements for generation. In case there is such additional element, Steps 210-260 may be repeated. Otherwise, the stimuli may be provided (Step 270) and utilized in verification of the DUT (Step 280). The stimuli may be a stimuli comprising all operations that were generated by the method (e.g., in Steps 240 and 250). In some exemplary embodiments, multiple stimulis may be generated by repeating the generation steps of the method.

In some exemplary embodiments, the generated stimuli may be, for example, a test comprising instructions for a target processor. The target processor may be verified by executing the test (e.g., by the target processor, post-silicon product thereof, or the like), by simulating execution thereof (e.g., using HDL simulator, using an emulator, or the like).

Figure 4:
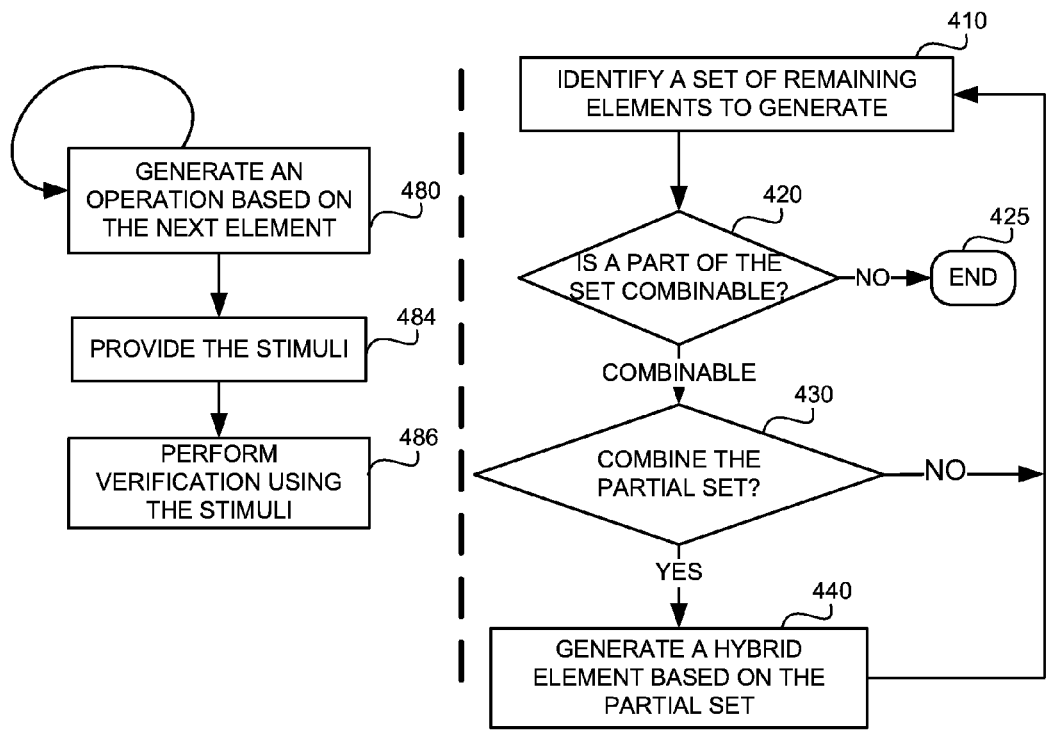
FIG. 4 shows a flowchart diagram of steps in a method for generating stimuli, in accordance with some exemplary embodiments of the disclosed subject matter.

Referring now to FIG. 4 showing a flowchart diagram of steps in an alternative method for generating stimuli, in accordance with some exemplary embodiments of the disclosed subject matter.

In Steps 410-440, elements of the generation streams are combined to hybrid elements. Whereas in Steps 480-486, based on the elements of the generation streams (including hybrid elements), operations (including hybrid operations) are generated and a stimuli is therefore generated and may be utilized. Steps 410-440 and Steps 480-486 may be performed in parallel. Additionally or alternatively, Steps 410-440 may be performed first to determine all the overlays in the stimuli and in response to such determination, Steps 480-486 may be performed.

In Step 410, a set of remaining elements to generate from generation streams may be determined.

In Step 420, it may be determined whether a part of the set is combinable, similarly to the determination of Step 220. In case it is, a determination whether to combine the partial set is performed (Step 430, similarly to Step 230) and a hybrid element adhering to the requirements of the set of combined elements is generated (Step 440) and may replace the partial set.

Steps 410-440 may be performed iteratively until no more combinations can be made (Step 425) or until all remaining possible combinations are determined not to be combined. Additionally or alternatively, the iterative process may be performed in parallel to the generation process of Steps 480, and may conclude in response to a determination that no additional elements remain for generation.

In Step 480, an operation may be generated based on an element, such as performed in Step 250. In case the element is a hybrid element (e.g., created in Step 440), the generated operation may be therefore considered as a hybrid operation. Step 480 may be performed iteratively generating operations in accordance with some order on the elements (e.g., a predetermined order between elements, a partial order between groups of elements such as elements provided in the same generation stream, or the like).

After all elements are processed, a stimuli is determined (Step 484). The stimuli may comprise all operations generated in Step 480. The determined stimuli may be outputted or otherwise provided.

In Step 486, the stimuli may be utilized for verification, such as disclosed with respect to Step 280.

Figure 3:
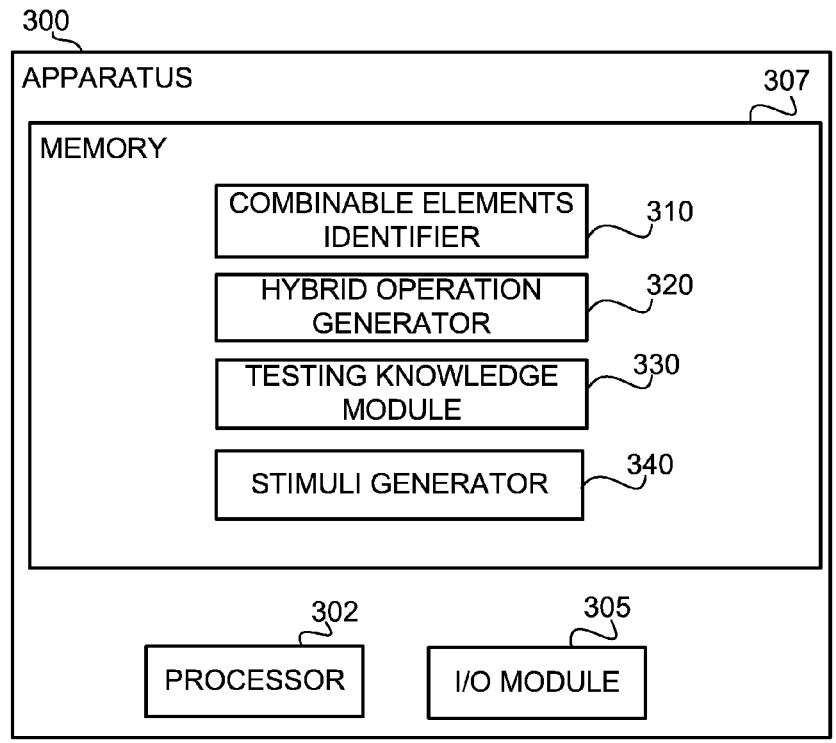
FIG. 3 shows a block diagram of components of an apparatus useful for stimuli generation, in accordance with some exemplary embodiments of the disclosed subject matter.

Referring now to FIG. 3 showing a block diagram of components of an apparatus useful for stimuli generation, in accordance with some exemplary embodiments of the disclosed subject matter. An Apparatus 300 may be a computerized apparatus adapted to perform a method such as depicted FIG. 2.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Apparatus 300 or any of it subcomponents.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation.

In some exemplary embodiments, I/O Module 305 may be utilized to provide an interface to a user (not shown), such as 175, which may utilize an MMI (not shown), such as 170, to interact with Apparatus 300, such as by reviewing results, logs and the like, providing commands, rules, preferences, formulas or the like, or interacting in any similar manner.

In some exemplary embodiments, Apparatus 300 may comprise a Storage Device 307. Storage Device 307 may be persistent or volatile. For example, Storage Device 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Storage Device 307 may retain program code operative to cause Processor 302 to perform acts associated with any of the steps shown in FIG. 1 and/or FIG. 2 above.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Combinable Elements Identifier 310 may be configured to identify whether two or more elements may be combined and implemented using a single operation. Combinable Elements Identifier 310 may be configured to perform steps any of steps 210-230 of FIG. 2. In some exemplary embodiments, Combinable Elements Identifier 310 may be configured to determine whether or not to combine elements that can be combined, such as based on testing knowledge. The testing knowledge may be provided using a Testing Knowledge Module 330, which may be configured to provide user-defined testing knowledge, user selections, generic testing knowledge, or the like.

A Hybrid Operation Generator 320 may be configured to generate a hybrid operation based on two or more elements for generation. Thereby, a stimuli that comprises the hybrid operation comprises a small number of operations than a sum of the elements for generation in the generation streams. Hybrid Operation Generator 320 may be configured to perform Step 240 of FIG. 2.

A Stimuli Generator 340 may be configured to generate a stimuli based on one or more generation streams. Stimuli Generator 340 may be operatively coupled to Combinable Elements Identifier 310 and Hybrid Operation Generator 320. Stimuli Generator 340 may be configured to invoke Hybrid Operation Generator 320 to generate a hybrid operation in response to a set of elements that are determined to be combined by Combinable Elements Identifier 310.

In some exemplary embodiments, Apparatus 300 may be configured to examine input streams it receives, identify candidates for overlays, and combine these candidates to a single operation in the generated stimuli. The combined operation should maintain it relations and constraints with the other elements in all the input streams the overlay covers. In some exemplary embodiments, Apparatus 300 may be automatic and may optionally utilize manual user guidance.

In some exemplary embodiments, examination of the input scenarios can be done during generation when Stimuli Generator 340 decides which element of which stream to generate next. At this time, Generator 340 can examine all the current candidates for generation, identify worthy candidates among them (using Combinable Elements Identifier 310), and generate the hybrid operation (using Hybrid Operation Generator 320). Additionally or alternatively, Generator 340 may examine input streams before the generation begins and decide of the overlaid elements (using Combinable Elements Identifier 310) prior to commencing generation.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a processor, the method comprising:
    obtaining one or more generation streams, wherein the one or more generation streams comprise elements, wherein each element is a specification which matches a set of one or more alternative processor instructions for a target processor of a system;
    generating a stimulus for the target processor in accordance with the one or more generation streams, wherein the stimulus comprises at least one hybrid operation, wherein the hybrid operation is a single processor instruction to the target processor that is configured to cause the target processor to perform a single processor operation, wherein the hybrid operation complies simultaneously with two or more elements of the one or more generation streams; and whereby the stimulus is comprised of a number of processor instructions that is smaller than a sum of the numbers of elements of the one or more generation streams.

2. The method of claim 1, wherein each of the generation streams is associated with a different scenario of the system, and wherein the stimulus is a combined scenario that at least partially overlays the different scenarios.

3. The method of claim 1, wherein said generating comprises, repeatedly:
   selecting a first element and a second element from a first generation stream and a second generation stream respectively; and
   generating one or more operations based on the first and second elements, wherein in response to a determination that the first and second elements are satisfiable by a single processor instruction, generating the hybrid operation.

4. The method of claim 3, wherein said generating the hybrid operation comprises:
   generating a hybrid element, wherein the hybrid element comprises requirements of the first and second elements; and
   based on the hybrid element, generating the hybrid operation, whereby the hybrid operation complies simultaneously with the first and second elements.

5. The method of claim 3, wherein said generating one or more operations further comprises:
   in response to a determination that the first and second elements cannot be satisfied by a single operation, generating two operations based thereon.

6. The method of claim 3, wherein the determination that the first and second elements are satisfiable by a single operation is performed by verifying that the first and second elements do not impose contradicting requirements.

7. The method of claim 3, wherein the determination that the first and second elements are satisfiable by a single processor instruction comprises determining that both the first element and the second element are satisfiable by a same instruction mnemonic.

8. The method of claim 1, wherein the hybrid operation is generated based on two elements of a same generation stream.

9. The method of claim 1, further comprising: selecting a first element and a second element out of a plurality of potential combinable elements, wherein the selection is based on testing knowledge, and wherein each of the potential combinable elements is a group of elements that are satisfiable by a single operation.

10. The method of claim 1, wherein the operations are instructions that are performed by the target processor, and wherein the one or more generation streams are obtained based on a verification scenario of the target processor.

11. The method of claim 10, wherein the one or more generation streams are defined based on a test template designed for the target processor.

12. A computerized apparatus having a processor, the processor being adapted to perform the steps of:
   obtaining one or more generation streams, wherein the one or more generation streams comprise elements, wherein each element is a specification which matches a set of one or more alternative processor instructions for a target processor a system; and
   generating a stimulus for the target processor in accordance with the one or more generation streams, wherein the stimulus comprises at least one hybrid operation, wherein the hybrid operation is a single processor instruction to the target processor that is configured to cause the target processor to perform a single processor operation, wherein the hybrid operation complies simultaneously with two or more elements of the one or more generation streams, whereby the stimulus is comprised of a number of operations that is smaller than a sum of the numbers of elements of the one or more generation streams.

13. The computerized apparatus of claim 12, wherein each of the generation streams is associated with a different scenario of the system, and wherein the stimulus is a combined scenario that at least partially overlays the different scenarios.

14. The computerized apparatus of claim 12, wherein generating comprises, repeatedly:
   selecting a first element and a second element from a first generation stream and a second generation stream, respectively; and
   generating one or more operations based on the first and second elements, wherein in response to a determination that the first and second elements are satisfiable by a single processor instruction, generating the hybrid operation.

15. The computerized apparatus of claim 14, wherein generating one or more operations further comprises:
   in response to a determination that the first and second elements cannot be satisfied by a single operation, generating two operations based thereon.

16. The computerized apparatus of claim 14, wherein the determination that the first and second elements are satisfiable by a single operation is performed by verifying that the first and second elements do not impose contradicting requirements.

17. The computerized apparatus of claim 12, wherein the hybrid operation is generated based on two elements of a same generation stream.

18. The computerized apparatus of claim 12, the processor being further adapted to select a first element and a second element out of a plurality of potential combinable elements, wherein the selection is based on testing knowledge, and wherein each of the potential combinable elements is a group of elements that are satisfiable by a single operation.

19. The computerized apparatus of claim 12, wherein the operations are instructions that are performed by the target processor, and wherein the streams are obtained based on a verification scenario of the target processor.

20. A computer program product comprising a non-transitory computer readable medium retaining program instructions, which instructions when read by a processor, cause the processor to perform the steps of:
   obtaining one or more generation streams, wherein the one or more generation streams comprise elements, wherein each element is a specification which matches a set of one or more alternative processor instructions for a target processor of a system; and
   generating a stimulus for the target processor in accordance with the one or more generation streams, wherein the stimulus comprises at least one hybrid operation, wherein the hybrid operation is a single processor instruction to the target processor that is configured to cause the target processor to perform a single processor operation, wherein the hybrid operation complies simultaneously with two or more elements of the one or more generation streams, whereby the stimulus is comprised of a number of processor instructions that is smaller than a sum of the numbers of elements of the one or more generation streams.

* * * * *